May 12, 1931.  R. R. ROBERTS ET AL  1,805,188
MACHINE TOOL
Filed March 7, 1927     8 Sheets-Sheet 1

INVENTORS
R. Russell Roberts
Worthy J. Forward
BY Harold E. Stonebraker
their ATTORNEY May 12, 1931.  R. R. ROBERTS ET AL  1,805,188
MACHINE TOOL
Filed March 7, 1927    8 Sheets-Sheet 2

Fig. 2

INVENTORS
R. Russell Roberts
Worthy J. Forward
BY Harold R. Stonebraker
their ATTORNEY May 12, 1931.   R. R. ROBERTS ET AL   1,805,188
MACHINE TOOL
Filed March 7, 1927   8 Sheets-Sheet 3

May 12, 1931.   R. R. ROBERTS ET AL   1,805,188
MACHINE TOOL
Filed March 7, 1927    8 Sheets-Sheet 4

May 12, 1931. R. R. ROBERTS ET AL 1,805,188
MACHINE TOOL
Filed March 7, 1927    8 Sheets-Sheet 5

INVENTORS
R. Russell Roberts
Worthy J. Forward
BY Harold E. Stonebraker
Their ATTORNEY May 12, 1931.   R. R. ROBERTS ET AL   1,805,188
MACHINE TOOL
Filed March 7, 1927   8 Sheets-Sheet 8

INVENTORS
R. Russell Roberts
Worthy J. Forward
BY Harold E. Stonebraker
their ATTORNEY Patented May 12, 1931

1,805,188

UNITED STATES PATENT OFFICE

ROLAND RUSSELL ROBERTS AND WORTHY J. FORWARD, OF ROCHESTER, NEW YORK, ASSIGNORS TO CONSOLIDATED MACHINE TOOL CORPORATION OF AMERICA, OF ROCHESTER, NEW YORK, A CORPORATION OF DELAWARE

MACHINE TOOL

Application filed March 7, 1927. Serial No. 173,398.

The invention relates to machine tools, and has to do more especially with a crank shaft milling machine for finishing the counterbalancing extensions or what are known as counter-weight pads on automobile crank shafts.

One of the principal objects of the invention is to provide simple and efficient mechanism governing movement of a work support in a crank shaft milling machine, such that its feed can be initiated by a manual operation after which it is automatically reversed at the end of the feed motion and automatically stopped at the end of the return motion to permit removal of the work and placement of a second piece.

Another purpose of the improvement is to afford a practicable form of work support particularly adapted to handling crank shafts of automobiles, and to permitting a crank shaft to be quickly positioned and clamped on the work support between consecutive milling operations.

A further object of the invention is to provide a rugged, sturdy machine of practical form, that is designed especially to make it possible to clamp a crank shaft in vertical position and to bring it into operative relationship with a series of cutters mounted on horizontal spindles with such an arrangement that the crank shaft can be positioned by an operator at the front of the machine and moved rearwardly for feeding to the cutters and returned to its forward position to permit removal of the work.

An additional purpose of the invention is to provide a machine of the general character mentioned, incorporating an arrangement of mechanism that will balance the parts, affording rigidity and strength, and rendering the mechanism free from vibration or chatter.

With these and certain other objects in view, the improvements comprise the construction and combination of parts that will appear from the following description when read in conjunction with the accompanying drawings, the novel features being pointed out in the claims following the specification.

The several features of improvement in the invention may be carried out in different ways and variously applied, and to illustrate the same, but one embodiment has been shown exemplifying its adaptation to finish milling of the counter-weight pads, or balancing extensions, on automobile crank shafts, although the disclosure is intended merely to illustrate one of the several possible practical applications.

Referring more particularly to the drawings, in which like reference numerals refer to the same parts throughout the several views, 1 designates the bed of a machine to which are secured the uprights or columns 2 rigidly connected at the top by the bridge or cross-head 3.

Figure 7:
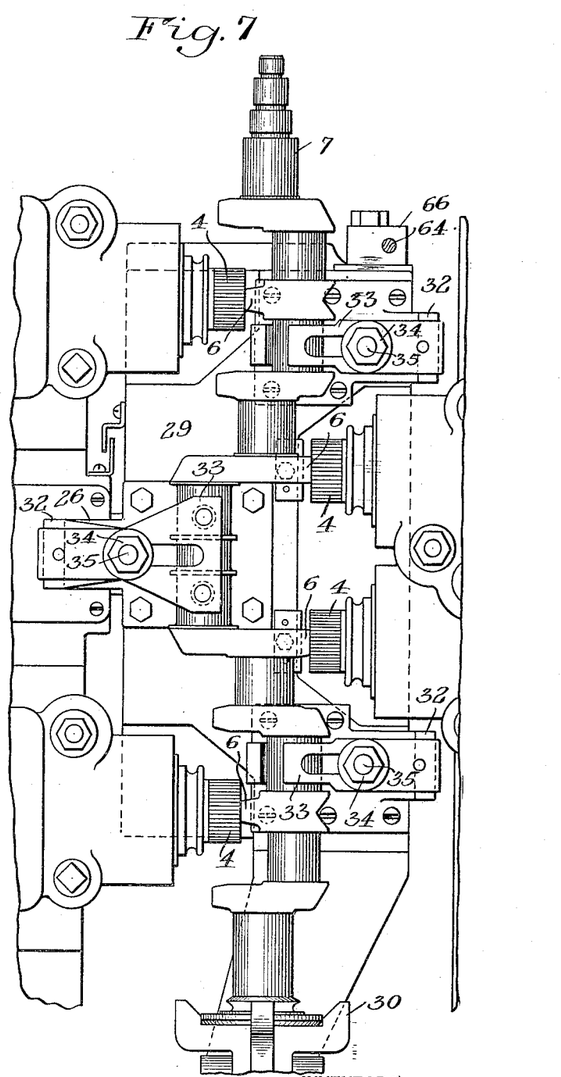
Figure 7 is a front elevation of the same, illustrating also the milling cutters and parts of their supporting uprights or columns.

4 designates milling cutters that are secured to horizontal spindles 5 journalled in suitable heads attached to the uprights. In the embodiment shown, there are four milling cutters, two arranged on one upright in juxtarelation to each other, and the other two arranged on the other upright at the top and bottom, such four cutters cooperating with the four counter-weight pads or balancing extensions 6 on the crank shaft 7, as shown in Figure 7.

Each spindle 5 has a tapered forward end 8 fitting within a correspondingly tapered sleeve 9, and rotating within a quill 10 the spindle being held in desired relation thereto by means of washers 11 and an adjustable collar 12, to permit taking up wear. The quill 10 is provided with a rack engaged by a pinion 13 by which the quill can be adjusted to compensate as the cutter is ground, suitable means being employed for clamping the quill in its adjusted position.

Figure 1:
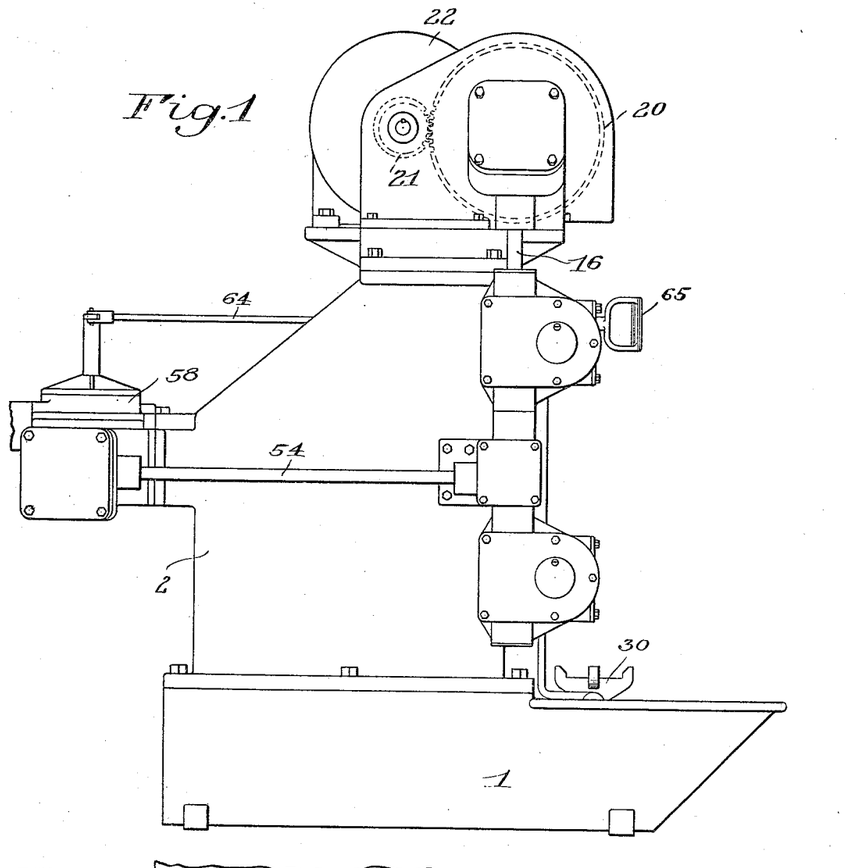
Figure 1 is a side elevation of a crank shaft milling machine incorporating a preferred embodiment of the various improvements.
Figure 2:
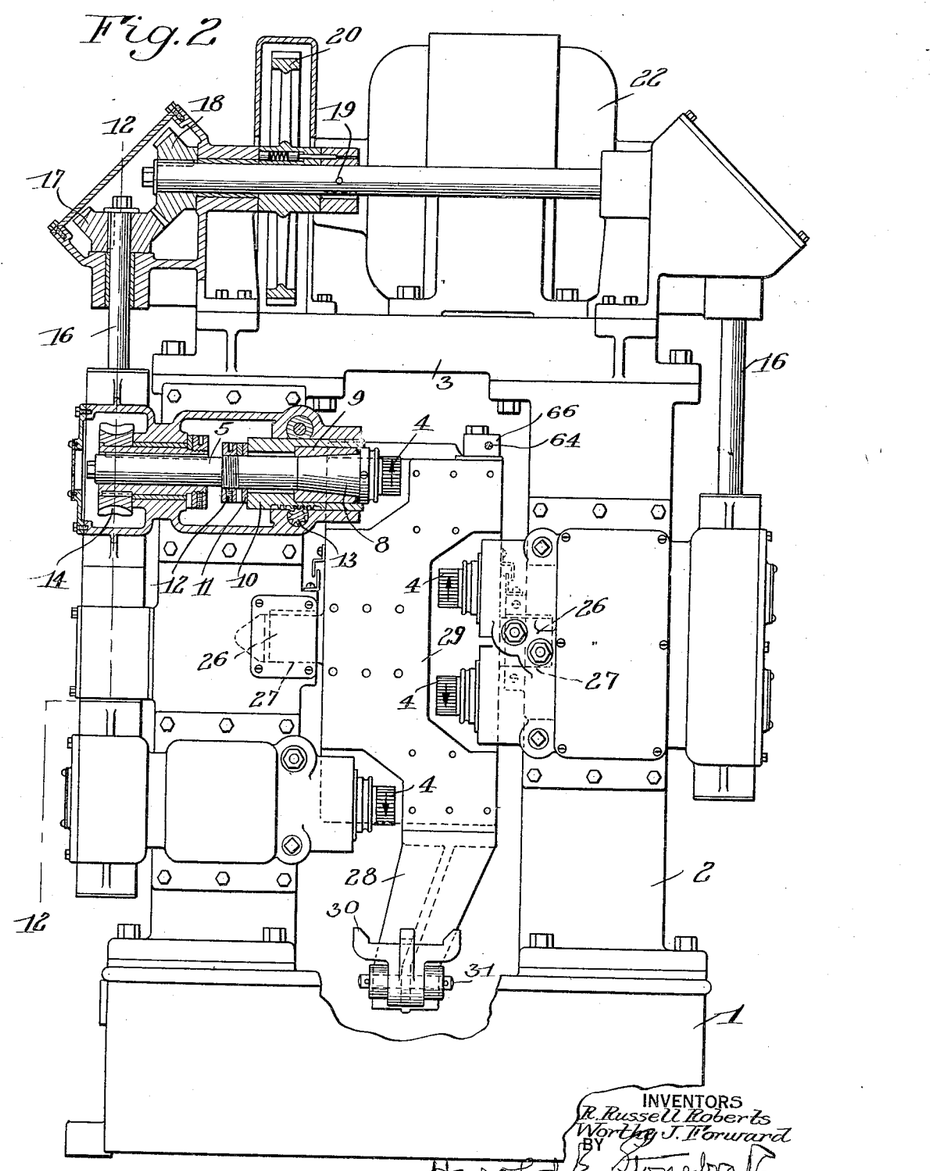
Figure 2 is a front elevation with parts broken away.
Figure 12:
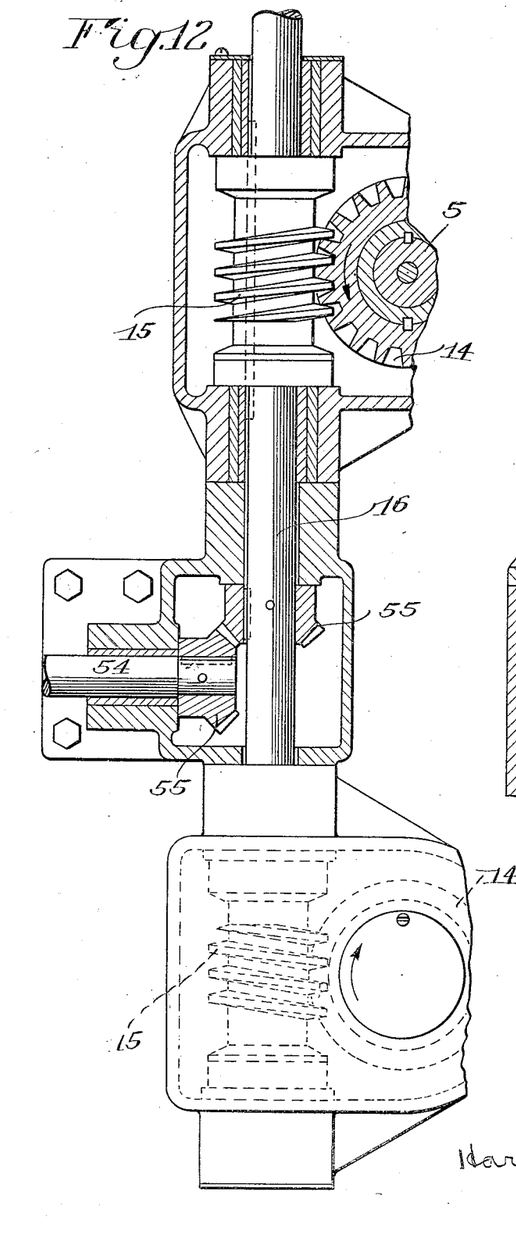
Figure 12 is a vertical sectional view, partially broken away, on line 12—12 of Figure 2.

Each spindle 5 carries in fixed relation therewith a worm gear 14 that is driven by a worm 15, see Figure 12, on vertical shaft 16, the arrangement of worms and worm gear just referred to being such that the two cutters on each upright rotate in opposite directions. Each vertical shaft 16 carries at its upper end a bevel pinion 17, see Figure 2, driven by a similar pinion 18 on shaft 19 which in turn has fixed thereon a spur gear 20 engaged by pinion 21, see Figure 1. The pinion 21 is on the armature shaft of electric motor 22 that is mounted on the cross-head 3 and furnishes the driving power for the machine.

The crank shaft 7 already referred to is mounted, in a manner that will be described presently, on a work support that is movable horizontally and designated generally at 25, see Figure 8. The work support 25 includes guide members 26, see Figure 2, slidable in guideways 27 of the uprights, said guide members 26 being arranged on opposite sides of the work support approximately midway between the top and bottom of the latter. The work support also includes vertical wall 29, see Figures 2 and 8, against which the crank shaft is clamped and arranged at the bottom thereof is a bracket or arm 28 extending downwardly and forwardly and located beneath the cutters. Mounted on the forwarding extending part of said bracket is a carrier for receiving and supporting the lower end of a crank shaft, and preferably comprising a spider 30 that is pivoted at 31, permitting it to tip forwardly as shown in Figure 16 in order to enable readily positioning a crank shaft thereon. The crank shaft or work piece being positioned endwise on the carrier 30 is swung to a vertical position and then clamped against the vertical wall 27 by the devices shown in Figures 6, 7 and 15.

Said clamping means comprise base plates with stationary lugs or abutments 32 suitably secured to the vertical wall of the work support, and clamping plates 33, one end of each of which is seated in a stationary abutment 32 while the free or adjustable end engages the adjacent part of the body of the crank shaft. Each clamping plate 33 is held in clamping relation to the crank shaft body portion by a nut 34 engageable with a bolt 35. 36 is a spring to assist in removing the clamping parts when the nuts 34 are loosened.

Figures 3, 14:
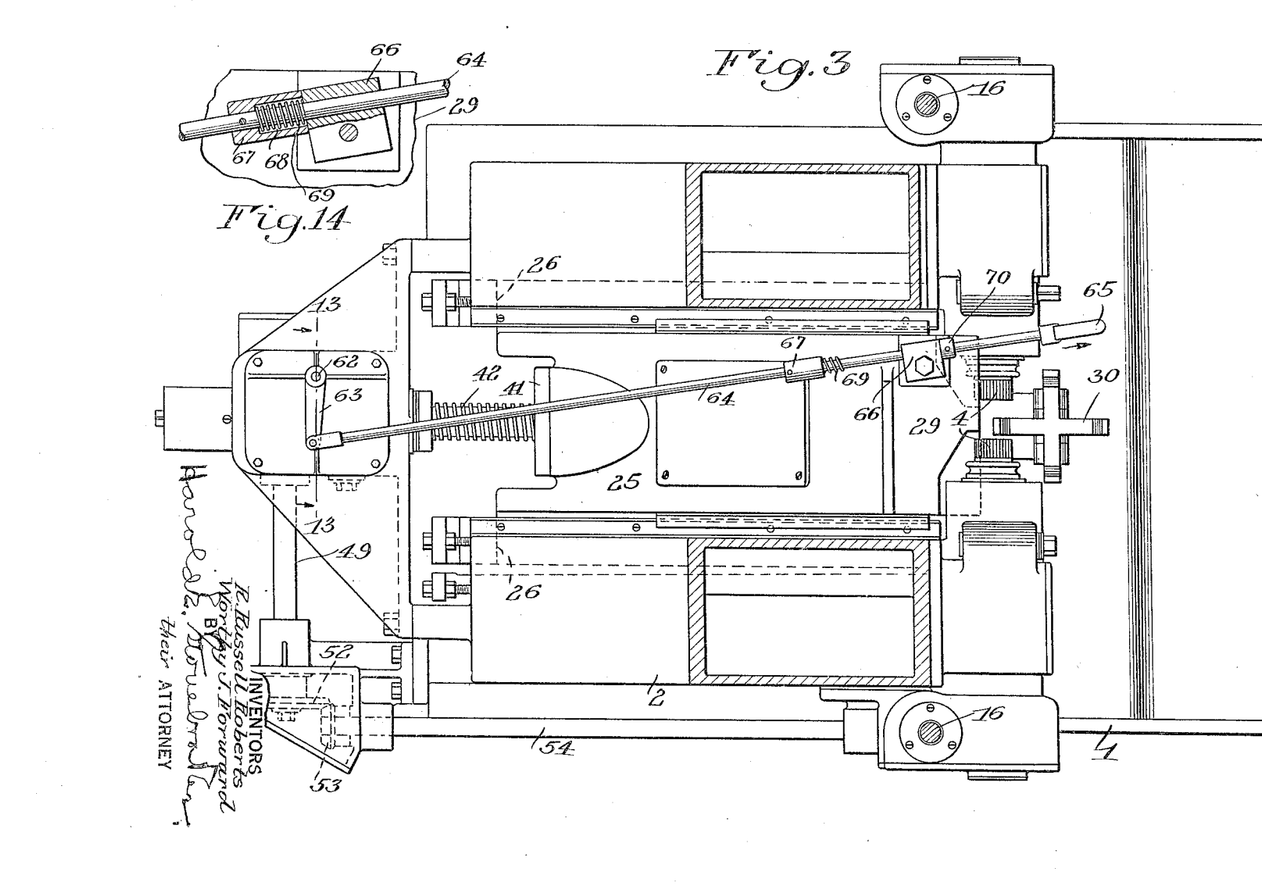
Figure 3 is a plan view partially in section, showing the initial or loading position of the work support and clutch rod.
Figure 14 is a detail sectional view of a portion of the clutch operating rod and its cooperating block on the work support.
Figure 5:
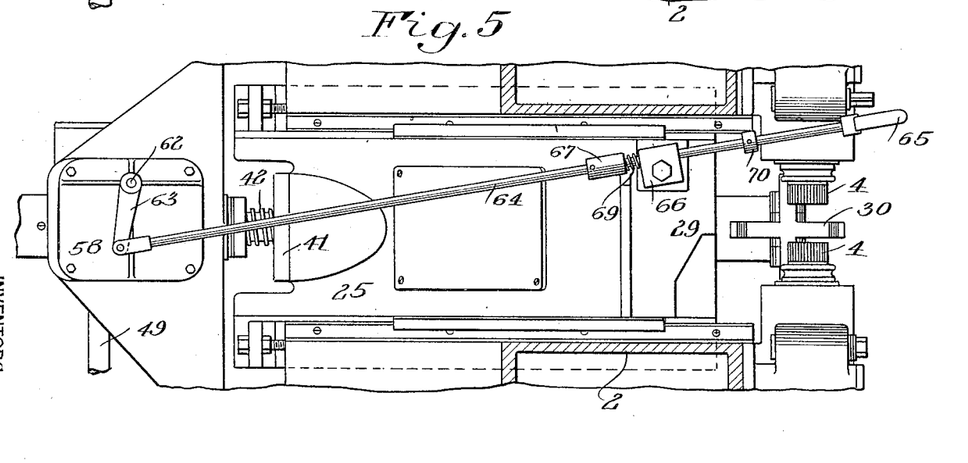
Figure 5 is a similar view showing the position of the parts when the work support has reached the limit of its feeding motion, and is ready to commence its return travel.
Figure 6:
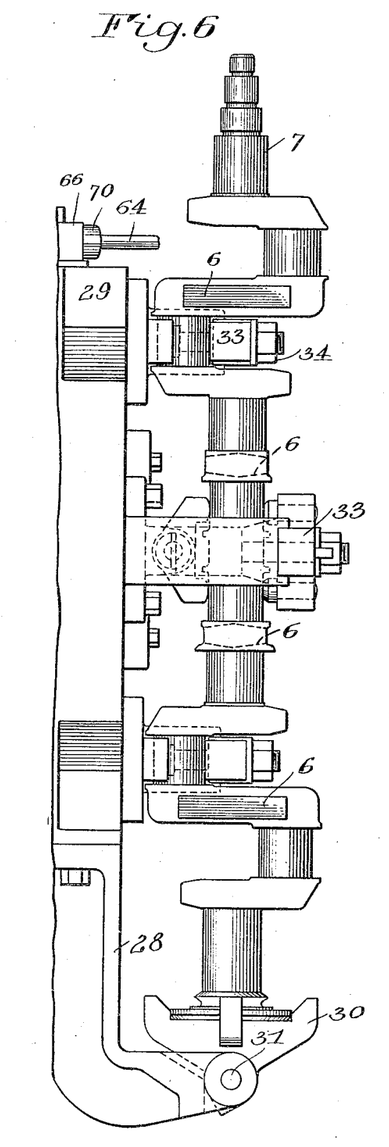
Figure 6 is a side elevation of the front part of the work support, with a crank shaft secured thereto in operative position.
Figure 15:
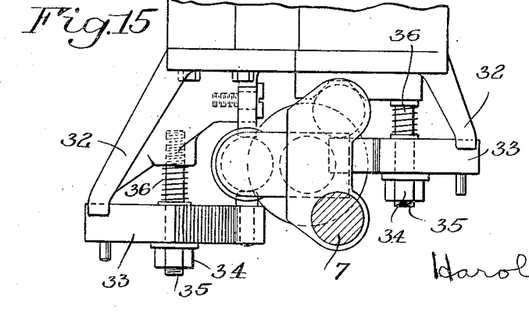
Figure 15 is a plan view, partially broken away, of the front part of the work support, showing a crank shaft in position.

The crank shaft is secured on the work support, as shown in Figures 6, 7 and 15 when the work support is in its extreme forward position, as illustrated in Figure 3. Then upon operation of the feed and return mechanism, the work support moves inwardly to the position shown in Figure 5 during which travel the counter-weight pads on the crank shaft are brought into operative relationship with the cutters. Upon completion of this operation, the work support is returned to the initial position shown in Figure 4 and finally stopped to permit the operator to remove the work and clamp another crank shaft on the work support. The mechanism for controlling the movement of the work support is as follows.

Figures 8, 16:
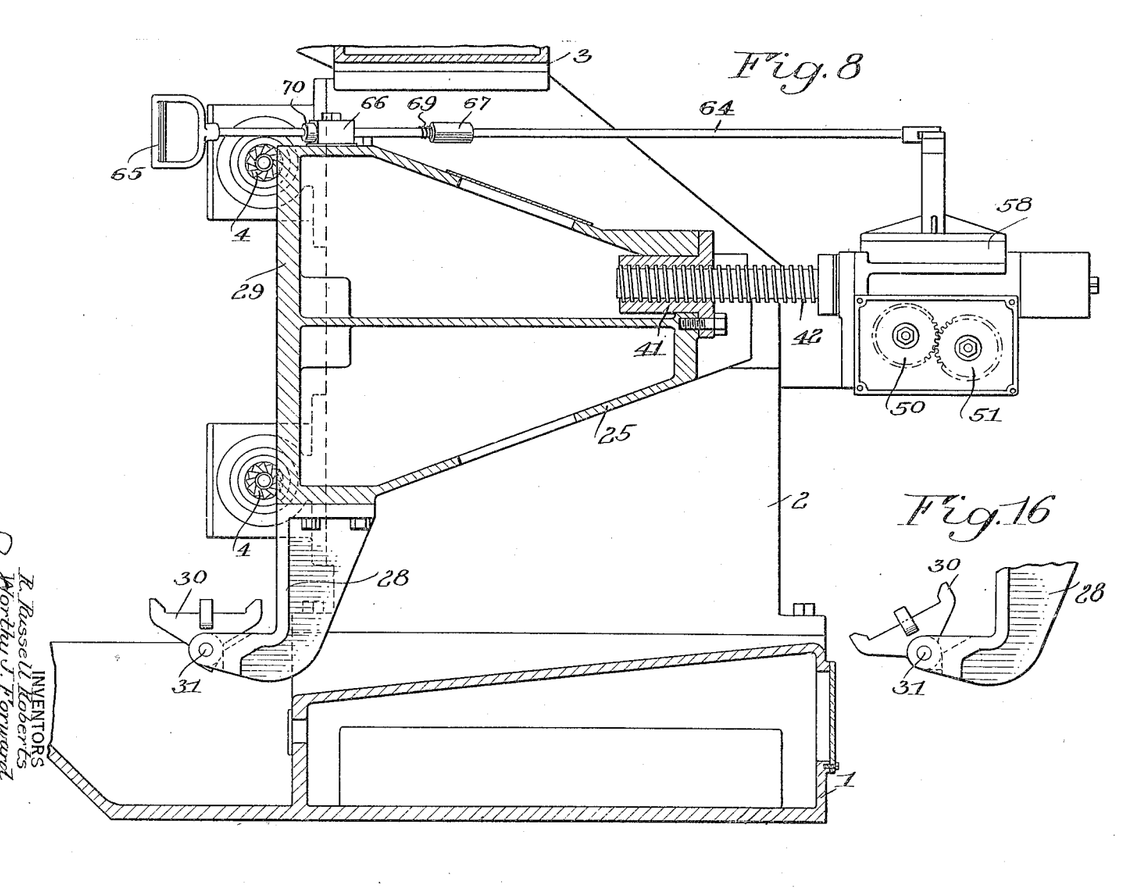
Figure 8 is a longitudinal vertical sectional view taken centrally.
Figure 16 is a detail side elevation, partially broken away, of the lower forward end of the work support, showing the carrier that receives the end of the crank shaft tipped forwardly.
Figure 9:
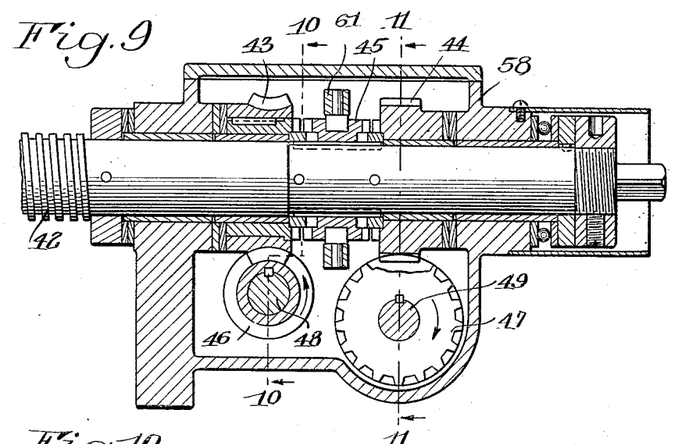
Figure 9 is a longitudinal sectional view through the feed and return mechanism.
Figures 10, 11:
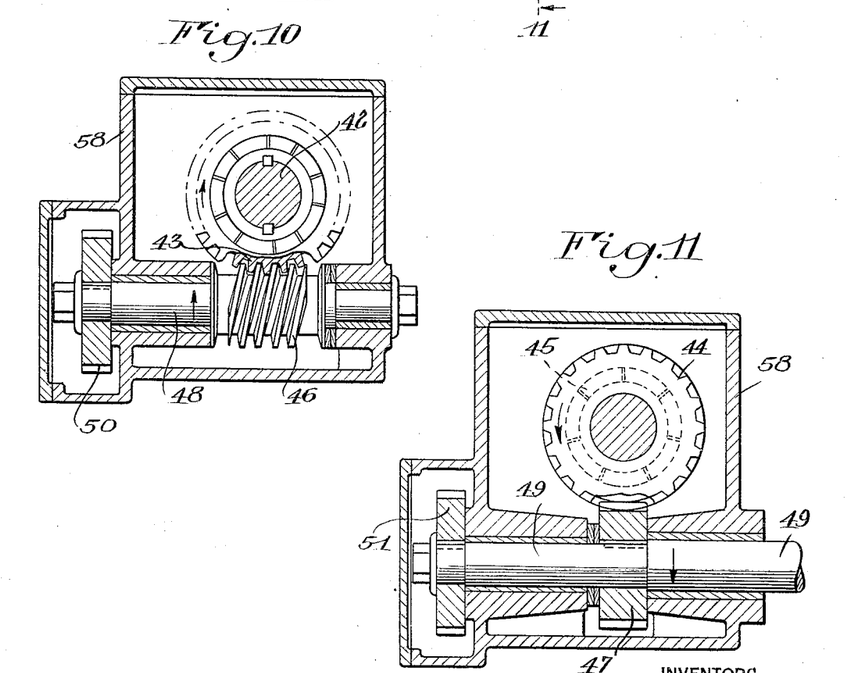
Figure 10 is a sectional view on line 10—10 of Figure 9.
Figure 11 is a sectional view on line 11—11 of Figure 9.

41 designates a nut fixedly mounted on the work support and engaged by screw 42, see Figures 8 and 9. The screw 42 is arranged to be turned alternately in opposite directions by means of a worm gear 43 that turns the screw 42 slowly for feeding, and a spiral gear 44 that turns the screw 42 at a fast speed in the reverse direction for returning the work support. The gears 43 and 44 are operated continuously in opposite directions, and 45 is a slidable clutch keyed on the screw 42 and engageable alternately with worm gear 43 and spiral gear 44. Said gears last mentioned are driven respectively by a worm 46 and spiral gear 47, the last named gears being mounted on shafts 48 and 49 which in turn carry the intermeshing spur gears 50 and 51. Shaft 49 carrying spiral gear 47 has on its opposite end a bevel gear 52, see Figure 3, that is driven by a bevel gear 53 on shaft 54, the latter carrying at its forward end a bevel pinion 55 engaged and operated by bevel pinion 56 on the vertical shaft 16, which thereby furnishes driving power to the feed and return mechanism from the aforementioned motor 22. The screw 42 and feed and return mechanism just described are mounted in a gear box or housing 58 secured to the rear of the columns or uprights 2, see Figure 1.

Figure 13:
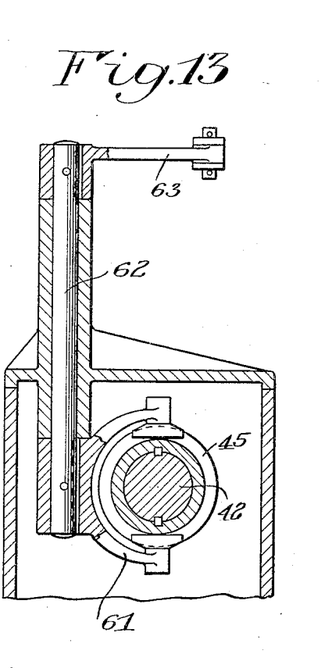
Figure 13 is a sectional view on line 13—13 of Figure 3.

Clutch 45 already referred to is operated back and forth through a clutch shifter 61, see Figure 13, fixed on rock shaft 62, to the opposite end of which is connected an arm 63 while 64 is a connecting or control rod extending to the front of the machine and provided with a handle 65 readily accessible to the operator for controlling the mechanism just described.

Figure 4:
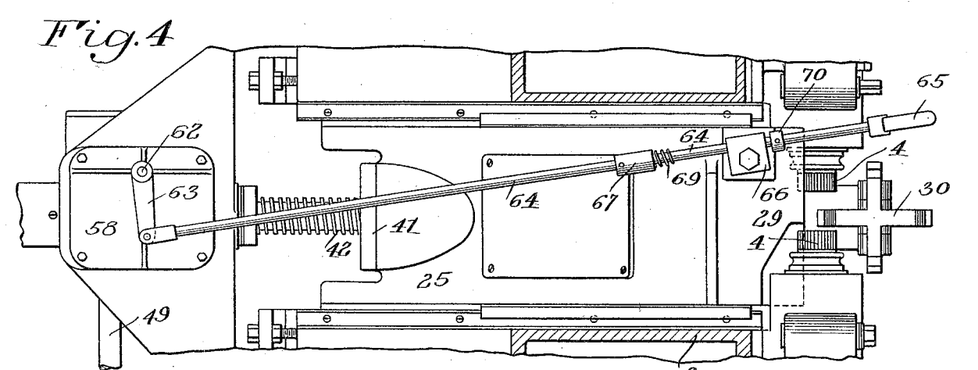
Figure 4 is a similar view with parts broken away, showing the position of the clutch rod when pulled forwardly by the operator to initiate feeding movement of the work support.

Rod 64 slides through an opening in a block 66, which is pivotally mounted on top of the work support. 67 is a stop or collar fixed on rod 64 and provided with a cylindrical recess 68 housing a spring 69, see Figure 14. 70 is a second stop also fixed on rod 64 on the forward side of the pivoted block 66, as shown in Figure 3. The parts are illustrated in the initial position in Figure 3, with the work support ready for reloading. Upon clamping a crank shaft in position on the work support as already described, the operator takes hold of the handle 65 and pulls the control rod 64 forwardly, as shown in Figure 4. This operation shifts the clutch 45 from its neutral position shown in Figure 9 to the left, into engagement with the slow rotating worm gear 43, thereby causing a slow rotation of screw 42 and consequent feeding movement of the work support rearwardly, bringing the crank shaft into operative relationship with the cutters 4.

As the work support moves rearwardly, carrying with it block 66, see Figures 3 to 5 inclusive, said block 66 engages spring 69 and compresses the same when the work support approaches the limit of its feeding movement. At the end of its rearward or feeding movement, the block 66 engages stop 67, as shown in Figure 14, causing a positive movement of the control rod 64, and thereby disengaging clutch 45 from worm gear 43. As this takes place, the power stored up in spring 69, as illustrated in Figure 14, is sufficient to throw the rod 64 to its extreme rearward position, thereby moving clutch 45 into engagement with spiral gear 44. This causes a fast turning of screw 42 in the opposite direction and returns the work support to loading position. When the latter reaches its return or initial position, block 66 engages stop 70 and moves control rod 64 forwardly far enough to disengage clutch 45 from the spiral gear 44, moving the clutch into the neutral position of Figure 9, which stops further travel of the work support in either direction. The parts are then ready for another operation and after the finished work piece is removed, the operator positions and clamps another crank shaft in place, whereupon he again draws the control rod 64 forwardly and the operation just described is repeated.

While the invention has been described with reference to certain particular construction, it is not confined to the details or arrangements herein set forth, and this application is intended to cover any modifications or departures that come within the intent of the improvements or the scope of the following claims.

We claim:

1. A crank shaft milling machine comprising a plurality of cutter spindles arranged one above the other in different horizontal planes on fixed supports, and a work support including means that permit positioning and clamping a crank shaft vertically supported on and engaging the work support at its lower end, the work support being movable bodily horizontally to feed the vertically arranged crank shaft past the cutters.

2. A crank shaft milling machine comprising a plurality of cutter spindles arranged one above the other in different horizontal planes on fixed supports, and a work support on which a crank shaft can be vertically positioned, said work support including a carrier at its bottom for receiving one end of the crank shaft and on which the crank shaft is supported, and a vertical wall to which the body of the crank shaft is clamped, the work support being movable bodily horizontally to feed the crank shaft past the cutters.

3. A crank shaft milling machine comprising a plurality of cutter spindles arranged one above the other in different horizontal planes on fixed supports, a work support on which a crank shaft can be vertically positioned, said work support including a pivoted carrier at its bottom for receiving one end of the crank shaft and on which the crank shaft is supported, and means for clamping the crank shaft to the work support, the work support being bodily movable horizontally to feed the crank shaft past the cutters.

4. A crank shaft milling machine comprising a plurality of cutter spindles, a work support on which a crank shaft can be vertically positioned, said work support including a pivoted carrier for supporting one end of the crank shaft and on which the crank shaft is supported and a vertical wall, and clamping devices attachable to said vertical wall for holding the crank shaft against rotation and in vertical position, the work support being bodily movable horizontally to feed the crank shaft past the cutters.

5. A crank shaft milling machine comprising a plurality of cutter spindles arranged one above the other in different horizontal planes on fixed supports, a work support on which a crank shaft can be vertically positioned, said work support including a vertical wall and an arm extending downwardly and forwardly from the bottom thereof, a carrier mounted on said arm to receive on end of the crank shaft and on which the crank shaft is supported, clamping means for attaching the body of the crank shaft to said vertical wall, and mechanism for bodily moving the work support horizontally to feed the crank shaft past the cutters.

6. A crank shaft milling machine comprising a plurality of cutter spindles arranged in different horizontal planes on fixed supports, a work support comprising a carrier at its bottom for supporting a crank shaft and adapted to engage one end of the crank shaft, a vertical wall on said work support, clamping means for attaching the body of the crank shaft to the vertical wall, said clamping means comprising an arm one end of which is adapted to engage a part of the crank shaft, a fixed abutment on the work support engaged by the other end of said arm, and securing means intermediate the ends of the arm for actuating the latter against the abutment and toward said vertical wall.

7. A crank shaft milling machine comprising a plurality of cutter spindles arranged in different horizontal planes on fixed supports, a work support on which a crank shaft can be clamped in vertical position, with the lower end of the crank shaft resting on the work support, a nut carried by the work support, and a screw engageable with the nut and operable slowly in one direction to feed the work past cutters and at a fast speed in the reverse direction to return the work support to initial position.

8. A machine tool comprising a cutter and a movable work support, feed and return mechanism controlling the work support including a clutch, a rod operable to shift the clutch to feeding position, a stop carried by the rod, a spring arranged in advance of said stop, means on the work support acting to successively compress said spring and engage said stop to shift the clutch, said spring acting to throw the clutch from feed to reverse position, and a second stop on the rod and engageable by means on the work support to shift the clutch from reverse to neutral position when the work support reaches its initial position.

9. A milling machine comprising a cutter and a movable work support, a nut secured to the work support, a screw engaging the nut for moving the work support, worm and spiral gears for selectively driving the screw at slow speed for feeding and fast speed for returning, a clutch on the screw engageable alternately with the worm and spiral gears, a rod connected to the clutch and operable to move the latter into engagement with the worm gear, a collar on the rod, a block on the work support through which the rod slides, a spring surrounding the rod and located for engagement in advance of said collar, the abutment acting as the work support is fed to initially compress said spring and thereafter engage the collar at the limit of the feeding movement, the spring acting to shift the clutch from feeding to reverse position, and a second collar on the rod engageable by said abutment when the work support reaches the limit of its return movement to shift the clutch to neutral position.

10. A crank shaft milling machine comprising a bed, uprights mounted on the bed, a cross-head connecting the uprights at the top, horizontal cutter spindles mounted on said uprights, a horizontally movable work support movable between the uprights, the uprights having guideways intermediate their tops and bottoms, and guides on the work support engaging said guideways, the work support including a carrier at its bottom for receiving one end of a crank shaft and a vertical wall to which the body of the crank shaft can be clamped.

11. A crank shaft milling machine comprising a bed, uprights mounted on the bed, a cross-head connecting the uprights at the top, horizontal cutter spindles mounted on said uprights, a horizontally movable work support movable between uprights, the uprights having guideways intermediate their tops and bottoms, guides on the work support engaging said guideways, the work support including a carrier at its bottom for receiving one end of a crank shaft, a vertical wall to which the body of the crank can be clamped, a nut secured to the work support, a screw engaging said nut, and feed and return mechanism controlling said screw.

12. A crank shaft milling machine comprising a bed, uprights mounted on the bed, a cross-head connecting the uprights at the top, horizontal cutter spindles mounted on said uprights, a horizontally movable work support movable between the uprights, the uprights having guideways intermediate their tops and bottoms, guides on the work support engaging said guideways, the work support including a carrier at its bottom for receiving one end of a crank shaft, a vertical wall to which the body of the crank can be clamped, a nut secured to the work support, a screw engaging said nut, feed and return mechanism controlling said screw and including a clutch, means for shifting the clutch into feeding position, and means governed by movement of the work support for automatically shifting the clutch to reverse position and again shifting it to neutral position when the work support reaches initial position.

13. A crank shaft milling machine including a series of horizontal cutter spindles and cutters located one above the other, a work support comprising a vertical wall positioned rearwardly of the cutters, an arm carried by the work support and extending downwardly and forwardly therefrom, and a carrier pivoted to said arm at its front end, the carrier being movable from a position forwardly of the cutters to a position beneath the same and adapted for supporting one end of a crank shaft, and clamping devices for securing the body of the crank shaft to said vertical wall.

14. A crank shaft milling machine including a plurality of horizontal cutter spindles, a movable work support, means for clamping a crank shaft thereon in vertical position, feed and return mechanism controlling movement of the work support and comprising a single clutch member shiftable alternately into engagement with feed and return gears, means for shifting the clutch into engagement with the feed gear, and devices acting automatically to shift the clutch into engagement with the return gear at the end of the feed movement and to shift the clutch into neutral position at the end of the return movement, said automatically acting devices comprising a block pivotally mounted on the work support, a clutch operating rod slidably mounted in said block, and stops fixed on the rod on opposite sides of the block.

In witness whereof, we have hereunto signed our names.

ROLAND RUSSELL ROBERTS.
WORTHY J. FORWARD.